Jan. 1, 1924
H. L. FERRIS
WATER BOWL
Filed March 8, 1922
1,479,499
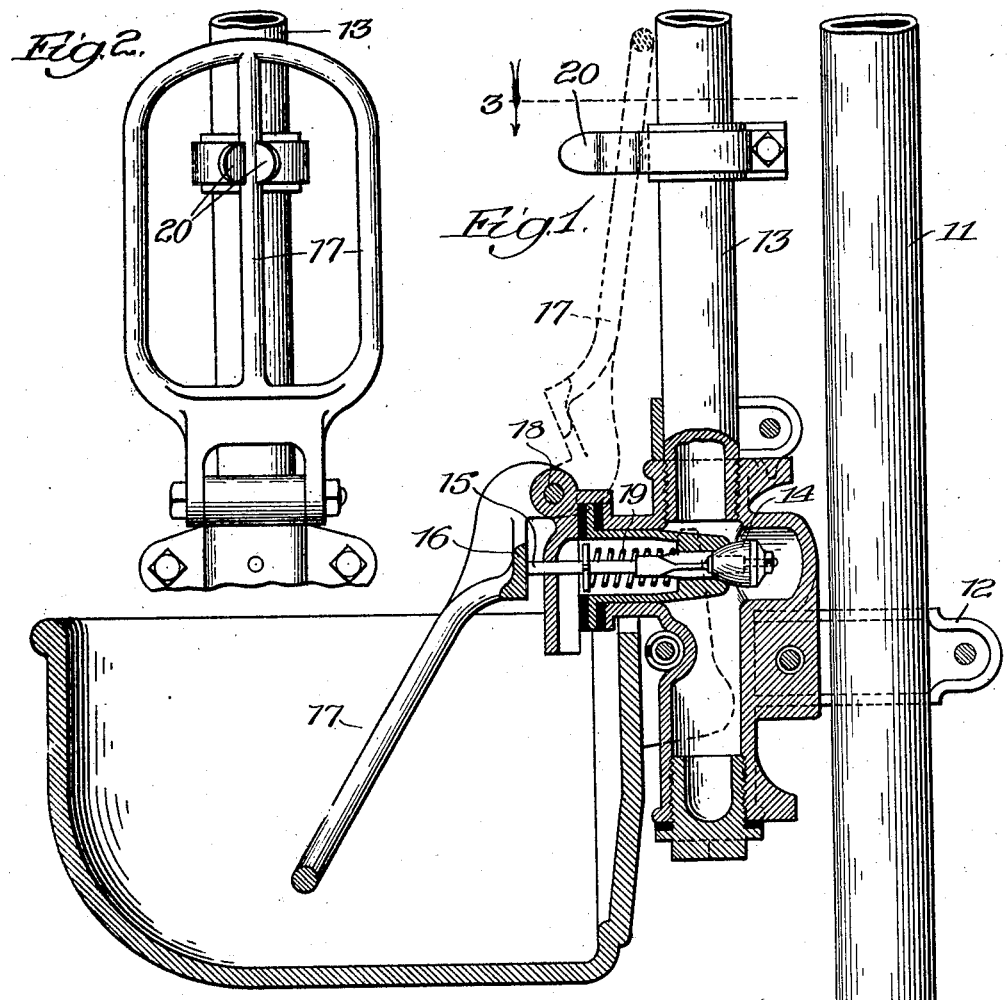
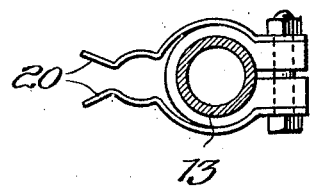

Patented Jan. 1, 1924.

1,479,499

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

WATER BOWL.

Application filed March 8, 1922. Serial No. 542,027.

*To all whom it may concern:*

Be it known that I, HENRY L. FERRIS, a citizen of the United States, residing at Harvard, in the county of McHenry and State of Illinois, have invented a new and useful Improvement in Water Bowls, of which the following is a specification.

This invention relates to water bowls and the like.

The primary object of the invention is to provide means for preventing an animal supplied with water from a water bowl from drinking too much at certain times, for example, when he is too warm.

This and other objects are accomplished by my invention which is fully described in the following specification and shown in the accompanying drawing, in which:

Figure 1 is a vertical section through a water bowl equipped with one embodiment of my invention;

Fig. 2 is a front elevation of the valve-operating member moved to inoperative position; and Fig. 3 is a horizontal section on the line 3 of Fig. 1.

In the embodiment illustrated, one form of the invention is applied to a well known type of water bowl consisting of a bowl 10 supported upon a vertical pipe 11 by means of a clamp 12. This bowl and method of mounting are fully illustrated and described in my Patent No. 1,330,438, granted February 10, 1920.

Water is supplied to this bowl from any suitable source through a pipe 13 and is controlled by means of the valve 14 having a valve stem 15 extending through the side of the valve housing and normally engaging the shoulder 16 of the valve-operating member 17, the latter being hingedly mounted upon the pin 18 which is carried by a part of the valve housing. The valve 14 is normally held upon its seat by the spring 19.

When a horse or other animal wishes to drink from this bowl it thrusts its nose into the bowl and against the valve-operating member 17 depressing this member and forcing the valve 14 off its seat, thereby admitting water into the bowl. As long as the animal holds the member 17 down, water will continue to flow and the animal may drink.

There are times when it is dangerous for an animal to drink too much water, for example, when a horse has been driven hard and is quite warm. To prevent this I have provided a means whereby the valve-operating member is rendered inoperative by a simple operation on the part of the animal tender which consists of swinging the valve-operating member 17 up into the dotted line position shown in Figure 1 when the central rib of the member 17 engages the spring clasp 20 and remains held in that position until released. As long as it is in this position the animal is unable to obtain any more water than that which is already in the bowl 10. He is unable, therefore, to founder himself as he might do if he were able to obtain all the water that he could drink.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all the novelty inherent in my invention as broadly as possible in view of the prior art.

What I claim as new and desire to secure by Letters Patent, is:

1. In combination, a water bowl, a valve for supplying water thereto, an animal operated member extending into said bowl and hingedly mounted for operating said valve, said member being movable about its pivot to a non-operable position outside said bowl, and a spring clip for holding said member in said position.

2. In combination, a water bowl, a pipe and valve for supplying water thereto, an animal operated member extending into said bowl and hingedly mounted for operating said valve, said member being movable about its pivot to a non-operable position outside said bowl, and a spring clip carried by said pipe for holding said member in said position.

HENRY L. FERRIS.